Dec. 22, 1953
D. D. SMART
2,663,449
VARIABLE VOLUME BAKING DEVICE
Filed Nov. 6, 1951
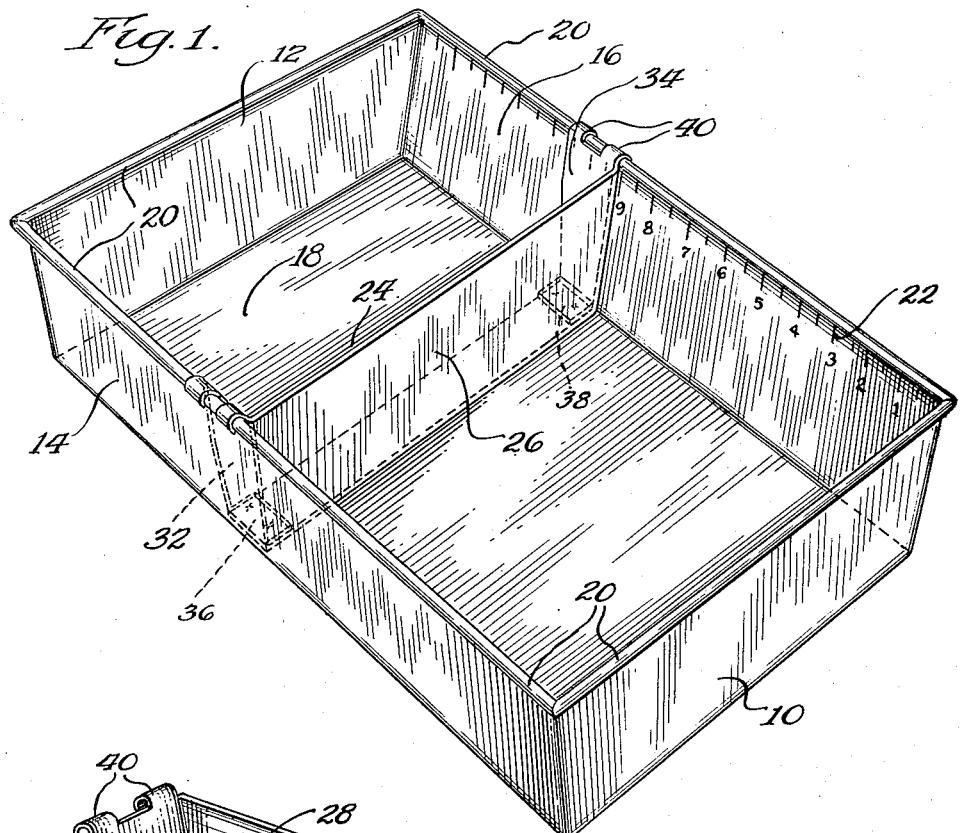
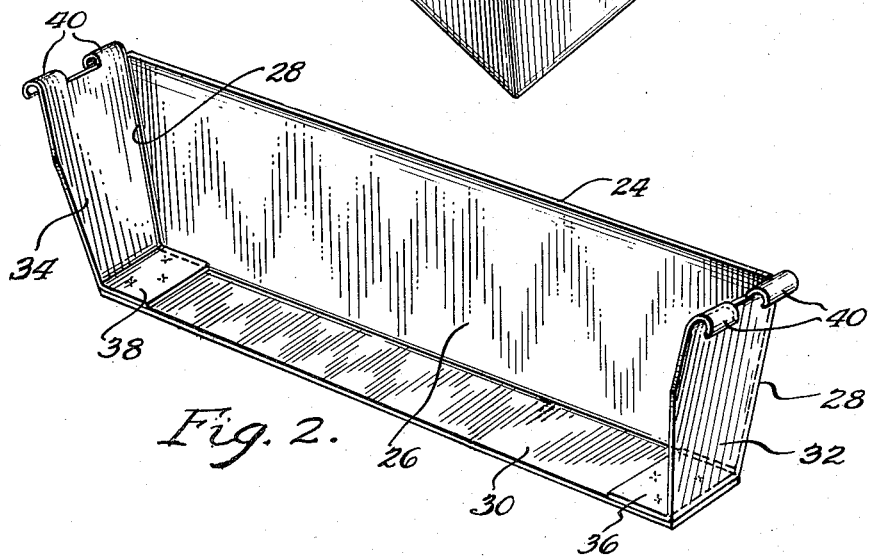
INVENTOR.
Dorothy Delle Smart
BY
Mann, Brown & Hansmann
Attorneys.

Patented Dec. 22, 1953

2,663,449

UNITED STATES PATENT OFFICE 2,663,449

VARIABLE VOLUME BAKING DEVICE

Dorothy Delle Smart, Highland Park, Ill.

Application November 6, 1951, Serial No. 255,021

3 Claims. (Cl. 220—22)

My invention relates to baking pans, and particularly those baking pans which are used for baking cakes or other bakery products having a somewhat fluid batter.

It is known that in the practice of the culinary arts many recipes for cakes, cookies, and the like call for a baking pan of a particular size, because the depth of the batter in the pan has an important bearing upon baking time and upon the appearance and quality of the end product. For this reason, most housewives have an assortment of baking pans of different sizes, none of which, on occasion, is correct for a particular recipe. Furthermore, these pans require considerable storage space, and the cost of a complete set of baking pans of the sizes specified in cook book recipes is relatively large.

The present invention meets the problem by providing a baking pan of variable volume that can quickly be adjusted to the volumetric requirements of the recipe, so that the housewife will always have a pan of appropriate area for any given recipe.

One of the objects of my invention, therefore, is to provide a single baking pan which may be used as a substitute for a plurality of different size pans. Another object of my invention is to provide a baking pan with a removable partition or wall which may be selectively placed and held within a baking pan to vary the baking volume. Another object of my invention is to provide a baking pan with a removable partition to vary the volume of the pan intended for baking and in which the desired baking pan area may be readily determined and selected by means of a scale on the pan. A still further object of my invention is to provide a variable volume baking pan which may be manufactured readily in quantity and which will be low in cost. Other objects and advantages will become apparent as the disclosure proceeds and the description is read in conjunction with the accompanying drawings, in which Fig. 1 is a perspective view of my improved baking pan with the removable partition in place;

Fig. 2 is a rear perspective view of the partition for use with a baking pan.

The baking pan comprises the usual end walls 10 and 12, side walls 14 and 16, and bottom 18. The end and side walls preferably terminate at their tops in rolled edges 20 which are provided to give strength to such walls and to resist bending thereof. Positioned on one or more of the walls and preferably on the inside top edge of a side wall is a linear scale 22 bearing numerical markings in inches and other indicia for fractions of inches. The scale extends the entire length of the wall and indicates intermediate distances from the wall at which the scale starts.

A removable partition 24 is formed of the same material as the baking pan, and is preferably of a one-piece construction. This partition consists of a wall portion 26 of substantially the same height and internal width as the baking pan, and has side edges 28 conforming in taper to the sides of the baking pan. The bottom edge 30 of the wall 26 is bent rearwardly at about a 90° angle and is of substantial width to provide rigidity to the wall 26 and a relatively wide frictional surface for engagement with the bottom of the pan 18 to retard movement of the partition when it is inserted in place within the pan. The sides of the wall 26 are bent rearwardly at a 90° angle to form side walls 32 and 34. The bottom portions 36 and 38 of these side walls are bent inwardly to overlap the side edges of the bottom 30 of the partition, at which points these parts may be secured together in any convenient manner such as by spot welding. The upper portions of the side walls 32 and 34 are formed to provide relatively wide guide hook portions 40 adapted to frictionally engage the rolled edges 20 of the walls. The curvature of the hook portions 40 in relationship to the side rolled edges is such that when the partition 24 is inserted in place within the baking pan, these hooks will firmly grip the top rolled edges to prevent movement of the partition once it is inserted in place. These hook portions 40 being relatively yieldable, however, do not prevent the ready removal of the partition from the baking pan. As shown in the drawings, these hook portions 40 are relatively wide and may either take the form of a single hook extending the width of the side members 32, 34 or may be formed to provide a plurality of separated hook portions to facilitate the cleaning thereof. These wide hook portions also serve to keep the partition in proper alignment between the side walls. The dimensions of the partition 24 are such that when this partition is inserted in place within the pan, there is a tight fit between the partition and the bottom of the pan and the side walls to prevent oozing of the material located within the pan out of the intended baking area. This tight fit also insures frictional engagement of the side walls 32, 34 and the bottom 30 with the pan to prevent sliding of the partition relative to the pan.

It will thus be seen that this partition may be formed of a single piece of metal by simple shearing and bending operations, and when completed is of a strong, durable construction.

Assuming that the baking pan of Fig. 1 is fifteen inches long and ten inches wide, the pan with the partition removed may be used when a recipe calls for a baking pan of this particular size. If a pan ten inches square is called for in a recipe, the partition 24 is placed in the pan with the front side of the partition in line with the ten inch mark on the scale. Likewise, if a recipe calls for a pan ten inches by six inches, the partition may be removed and shifted to the point identified with the six inch mark on the scale. If a recipe calls for a baking pan nine inches by five inches, it is, of course, readily apparent that the base of the pan should have a baking area of forty-five square inches, and by a rapid calculation, it can be determined that since the width of the pan shown in Fig. 1 is ten inches, the partition should be placed in the pan with the front face thereof in line with the mark designating four and one-half inches. Thus, although the basic dimensions of this baking pan do not include either the five inch or the nine inch dimension, nevertheless the pan may be used to comply with a recipe calling for a pan of this size. Various other positions of the partition will adapt the baking pan for use with recipes calling for baking pans having a volume less than the maximum volume of the pan itself.

It will thus be seen that I have provided a baking pan with a removable partition to be used in varying the volume of the pan and to thus accommodate to the requirements of various recipes. It is also apparent that by the construction set forth, I have provided such a variable volume pan which is durable in construction and may be relatively easily manufactured in quantity at a low cost.

Having thus described the invention, what is claimed as new and desired to be secured by Letters Patent is:

1. A variable volume baking device comprising a baking pan having a bottom, end walls, and side walls, said end and side walls being smooth and continuous, said walls terminating at their upper ends in rolled edges, and a removable partition frictionally held between opposed walls of said baking pan, said partition including a front wall, a base portion extending rearwardly from said front wall, side wall portions extending rearwardly from said front wall, and a pair of spaced guide hooks carried by each of said partition side walls at the upper margin thereof and frictionally engaging the rolled edges of the walls of the baking pan between which the partition is inserted.

2. In combination, a baking container for dough products comprising a metal pan having smooth unbroken bottom, side and end walls with the side and end walls having a top bead, and a divider movably mounted within said pan to selectively vary the volume of the pan to be used for baking purposes, said divider having a planar front portion corresponding in size and shape to the wall of the pan which it opposes, whereby it forms a snug fit with the adjacent bottom and contiguous walls of the pan, said divider having a side wall portion extending rearwardly from and rigid with each end of said front portion, and a pair of spaced guide hooks carried by each of said divider side walls at the upper margin thereof and frictionally engaging said top bead of the pan.

3. A baking container as set forth in claim 2 in which a scale is formed on said contiguous walls of the pan to permit ready calculation of the area of the pan to be used for baking.

DOROTHY DELLE SMART.

References Cited in the file of this patent

UNITED STATES PATENTS

| Number | Name | Date |
|---|---|---|
| 597,188 | Nance | Jan. 11, 1898 |
| 960,833 | Crum | June 7, 1910 |
| 1,555,533 | Vance | Sept. 29, 1925 |
| 1,666,172 | Gollnick | Apr. 17, 1928 |
| 1,688,003 | Darby | Oct. 16, 1928 |
| 2,020,373 | Petzold | Nov. 12, 1935 |
| 2,501,588 | Somers | Mar. 21, 1950 |